US009980079B2

(12) United States Patent
Cai et al.

(10) Patent No.: US 9,980,079 B2
(45) Date of Patent: May 22, 2018

(54) METHOD AND APPARATUS FOR DATA MESSAGE DELIVERY TO A RECIPIENT MIGRATED ACROSS TECHNOLOGY NETWORKS

(75) Inventors: Yigang Cai, Naperville, IL (US); Alok Sharma, Lisle, IL (US)

(73) Assignee: WSOU Investments, LLC, Los Angeles, CA (US)

(*) Notice: Subject to any disclaimer, the term of this patent is extended or adjusted under 35 U.S.C. 154(b) by 2158 days.

(21) Appl. No.: 12/171,629

(22) Filed: Jul. 11, 2008

(65) Prior Publication Data

US 2010/0009701 A1 Jan. 14, 2010

(51) Int. Cl.
*H04W 4/00* (2009.01)
(52) U.S. Cl.
CPC .................................. *H04W 4/00* (2013.01)
(58) Field of Classification Search
USPC ............ 455/466, 445, 433, 417, 414, 426.1, 455/550.1, 412.1
See application file for complete search history.

(56) References Cited

U.S. PATENT DOCUMENTS

| | | | |
|---|---|---|---|
| 6,098,076 A * | 8/2000 | Rekieta et al. | |
| 6,748,229 B1 * | 6/2004 | Calatrava-Requena et al. | 455/466 |
| 7,013,156 B2 * | 3/2006 | Smith et al. | 455/466 |
| 7,239,866 B2 | 7/2007 | Cai et al. | |
| 2008/0130663 A1 * | 6/2008 | Fridman et al. | 370/401 |

OTHER PUBLICATIONS

McTEL [Mobility], Instant Delivery SMS Router, www.mctel.net.
Converse, SMS Accelerate.
Duolun, Liang, Movistar Building A Multinational SMS Network, Solution, Feb. 2007, Issue 27, p. 36-37.

* cited by examiner

*Primary Examiner* — Kent Chang
*Assistant Examiner* — Chayce Bibbee
(74) *Attorney, Agent, or Firm* — Sean D. Burdick

(57) ABSTRACT

A method of providing SMS delivery to recipients migrated across different technology networks. The method includes receiving a short message service (SMS) text message from a sender at a short message service center (SMSC), wherein the SMS text message includes a destination number for a recipient of the SMS text message. A first routing request is sent to a database in a first network for SMS routing information for the destination number via a first signal transfer point (STP). The first STP determines whether the destination number is a migrated or a non-migrated destination number based on data received from the first database. An error indication is provided to the SMSC if the destination number and the first routing request are for different communication networks. Finally, a second routing request is sent to a second database in a second network for SMS routing information for the destination number via a second STP.

7 Claims, 4 Drawing Sheets

METHOD AND APPARATUS FOR DATA MESSAGE DELIVERY TO A RECIPIENT MIGRATED ACROSS TECHNOLOGY NETWORKS

BACKGROUND OF THE INVENTION

The present invention relates generally to the field of telecommunications and, more particularly, to a method and apparatus for data message delivery to recipients migrated across technology networks.

While the invention is particularly directed to the art of telecommunications, and will be thus described with specific reference thereto, it will be appreciated that the invention may have usefulness in other fields and applications.

By way of background, SMS (Short Message Service) provides a mechanism for transmitting short text messages to and from wireless devices. The service makes use of an SMSC (Short Message Service Center), which acts as a store-and-forward system for short messages. The wireless network provides the mechanisms required to find the destination station(s) and transports short messages between the SMSCs and wireless stations. In contrast to other existing text-message transmission services such as alphanumeric paging, the service elements are designed to provide guaranteed delivery of text messages to the destination. Additionally, SMS supports several input mechanisms that allow interconnection with different message sources and destinations.

A distinguishing characteristic of the service is that an active mobile handset is able to receive or submit a short message at any time, independent of whether a voice or data call is in progress (in some implementations, this may depend on the MSC or SMSC capabilities). The SMSC also guarantees delivery of the short message by the network. Temporary failures due to unavailable receiving stations are identified, and the short message is stored in the SMSC until the destination device becomes available. SMS is characterized by out-of-band packet delivery and low-bandwidth message transfer, which results in a highly efficient means for transmitting short bursts of data. A variety of services has been introduced, including e-mail, fax, and paging integration, interactive banking, information services such as stock quotes, and integration with Internet-based applications. Wireless data applications include downloading of subscriber identity module (SIM) cards for activation, debit, profile-editing purposes, wireless points of sale (POSs), and other field-service applications such as automatic meter reading, remote sensing, and location-based services.

Many mobile subscribers get ported from one network to another network (inter technology roaming), such from CDMA to GSM (or UMTS) and vice versa, without change mobile phone number. Number portability (NP) has been implemented in various switches for voice communication. The STP (Signal Transfer Point) will usually provision its database for routing of ported number. However, this has not yet worked for data messaging such as Short Message Service (SMS) and Multimedia Message Service (MMS), since the original NP solution is MSC/HLR-based. Insofar as SMS data messages (as opposed to voice messages) involve message retries for a pre-defined number of times, an SMSC based solution is more suitable than an MSC/HLR based solution because the SMSC has a built-in fool-proof retry mechanism.

The present invention contemplates a new and improved SMS delivery method that resolves the above-referenced difficulties and others.

SUMMARY OF THE INVENTION

In one aspect of the invention, a method of providing SMS delivery to recipients migrated across different technology networks is provided. The method includes: receiving a short message service (SMS) text message from a sender at a short message service center (SMSC), wherein the SMS text message includes a destination number for a recipient of the SMS text message; sending a first routing request to a database in a first network for SMS routing information for the destination number via a first signal transfer point (STP); determining at the first STP whether the destination number is a migrated or a non-migrated destination number based on data received from the first database; providing an error indication to the SMSC if the destination number and the first routing request are for different communication networks; and sending a second routing request to a second database in a second network for SMS routing information for the destination number via a second STP.

In another aspect of the invention, an apparatus for providing SMS delivery to recipients migrated across different technology networks is provided. The apparatus includes: receiving means for receiving a short message service (SMS) text message from a sender, wherein the SMS text message includes a destination number for a recipient of the SMS text message; first sending means for sending a first routing request to a database in a first network for SMS routing information for the destination number via a first signal transfer point (STP); determining means for determining at the first STP whether the destination number is a migrated or a non-migrated destination number based on data received from the first database; providing means for providing an error indication to the SMSC if the destination number and the first routing request are for different communication networks; and second sending means for sending a second routing request to a second database in a second network for SMS routing information for the destination number via a second STP.

In yet another aspect of the invention, a computer program product is provided. The computer program product comprises a computer-usable data carrier storing instructions that, when executed by a computer, cause the computer to perform a method comprising: receiving a short message service (SMS) text message from a sender at a short message service center (SMSC), wherein the SMS text message includes a destination number for a recipient of the SMS text message; sending a first routing request to a database in a first network for SMS routing information for the destination number via a first signal transfer point (STP); determining at the first STP whether the destination number is a migrated or a non-migrated destination number based on data received from the first database; providing an error indication to the SMSC if the destination number and the first routing request are for different communication networks; and sending a second routing request to a second database in a second network for SMS routing information for the destination number via a second STP.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 1:
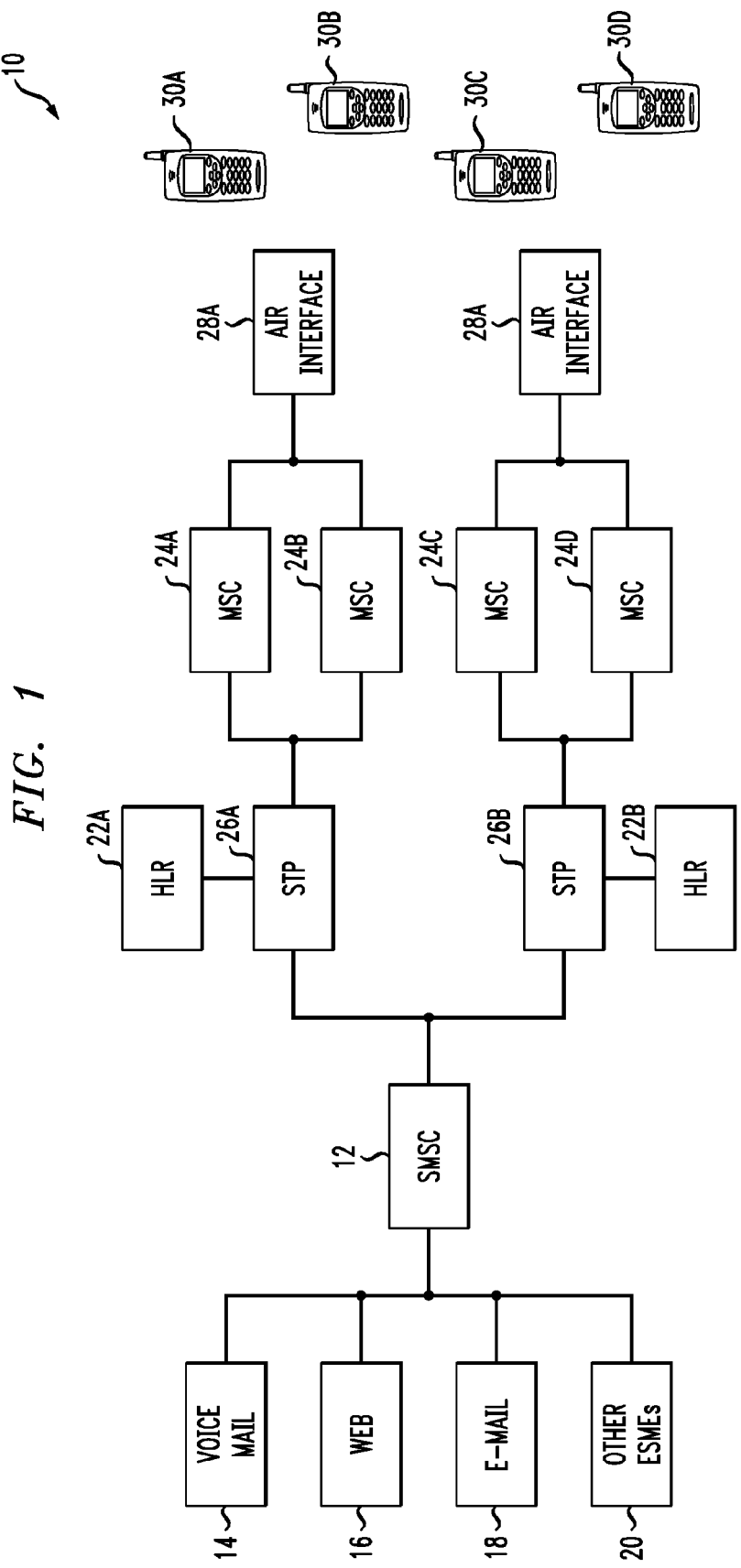
FIG. 1 is a block diagram of a network suitable for implementing aspects of the present invention.

Referring now to the drawings wherein the showings are for purposes of illustrating the exemplary embodiments only and not for purposes of limiting the claimed subject matter, FIG. 1 provides a view of a system or network 10 into which the presently described embodiments may be incorporated. In this regard, FIG. 1 includes an IS-41 SMSC 12 handling multiple input sources, including a voice-mail system (VMS) 14, Web-based messaging 16, e-mail integration 18, and other external short message entities (ESMEs) 20. An ESME is a device that may receive or send short messages.

Communication with various wireless network elements such as one or more home location registers (HLRs) 22 and one or more mobile switching centers (MSCs) 24 may be achieved through one or more signal transfer points (STPs) 26.

The VMS 14 is responsible for receiving, storing, and playing voice messages intended for a subscriber that was busy or not available to take a voice call. It is also responsible for sending voice-mail notifications for those subscribers to the SMSC 12.

The SMSC 12 must support interconnection to e-mail servers acting as message input/output mechanisms. There are several other mechanisms to submit short messages to the SMSC 12 that include, but are not limited to, paging networks, specialized software for PC-based messaging and operator bureaus.

The SMSC 12 is a combination of hardware and software responsible for the relaying and storing and forwarding of a short message between an SME and mobile device. The SMSC 12 supports multiple technology network protocols and number ranges. The technology networks may include, but are not limited to, CDMA, GSM, UMTS (WCDMA), IMS, TD-SCDMA and others.

The STP 26 is a network element normally available on IN (Intelligent Network) deployments that allows IS-41 interconnections over signaling system 7 (SS7) links with multiple network elements.

The HLR 22 is a database used for permanent storage and management of subscriptions and service profiles. Upon interrogation by the SMSC 12, the HLR 22 provides the routing information for the indicated subscriber. Also, if the destination station was not available when the message delivery was attempted, the HLR 22 informs the SMSC 12 that the station is now recognized by the mobile network to be accessible, and thus the message can be delivered.

Although not shown, the system 10 generally includes at least one visitor location register (VLR). The VLR is a database that contains temporary information about subscribers homed in one HLR who are roaming into another HLR 22. This information is needed by the MSC 24 to service visiting subscribers.

The MSC 24 performs the switching functions of the system and controls calls to and from other telephone and data systems. The MSC 24 will deliver the short message to the specific mobile subscriber through the proper base station.

An air interface 28 is defined in each one of the different wireless technologies (e.g., GSM, TDMA, and CDMA). These standards specify how the voice or data signals are transferred from the MSC 24 to the handset and back, as well as the utilization of transmission frequencies, considering the available bandwidth and the system's capacity constraints.

The system 10 further includes at least one SME (Short Message Entity) 30. The SME 30 is an entity that may receive or send short messages, and it may be located in the fixed network, a mobile station or another service center. Commonly, these devices have been digital cellular phones, but more recently the application of SMS has been extended to other terminals such as POS, handheld computers, and personal digital assistants (PDAs).

The wireless network signaling infrastructure is based on SS7. SMS makes use of the mobile application part (MAP), which defines the methods and mechanisms of communication in wireless networks and employs the services of the SS7 transactional capabilities application part (TCAP). An SMS service layer makes use of the MAP signaling capabilities and enables the transfer of short messages between the peer entities. The capabilities of the terminal vary depending on the wireless technology supported by the terminal.

All functions related to the transmission of electromagnetic radio signals between the MSC 24 and the mobile devices 30 are performed in the base station (not shown). The base station consists of base station controllers (BSCs) and the base transceiver stations (BTSs), also known as cell sites or simply "cells." The BSC may control one or more BTSs and is in charge of the proper resource assignment when a subscriber moves from one sector of one BTS to another, regardless of whether the next sector lies within the same BTS or in a different one.

The SMSC 12 keeps a record database for migrated and non-migrated subscribers. The database is dynamically updated. The service provider can routinely provision and update the migration database. However, the SMSC updates the database when first routing to the first network is failed, and the SMSC dynamically update the subscriber data based on service rules and the STP feedback info. The entry of each subscriber may include but not limit to directory number, single or dual radio model type, current assigned network, next allowed network, rest of potential networks, re-routing trial number, etc.

For each subscriber, the SMSC 12 provisions a current network to which the SMSC will route an SMS message to. The SMSC 12 also provisions decision rules as to what network the SMSC 12 shall try if the first routing fails (assuming that more than two technology networks are supported by the SMSC 12). Not all subscribers will be permitted to communicate with the same number of different technology networks. For example, dual mode handset subscribers are always provisioned with two technology networks; however, some of them may be allowed third technology network migration. The service logic rules at the SMSC 12 will determine how many tries allowed for each subscriber number.

The SMSC 12 uses existing STP subscriber provisioning to learn the migrated subscriber. Only when the SMSC 12 receives an error routing message from the STP will the SMSC 12 will seek re-routing. That saves SMSC operation and reduces the unnecessary traffic.

The SMSC 12 will update subscriber number migration record once receives the STP error message. That future SMS delivery request will be sent to the right technology network Service Logic for Migrated SMS Recipient In accordance with aspects of the present invention and with continued reference to FIG. 1, when the SMSC 12 sends a request to an HLR (e.g., 22A) for SMS routing information, the corresponding STP (e.g., 26A) will recognize whether the destination number is a migrated or a non-migrated destination number and provide an error indication if the destination number and the HLR request message are for different networks. Then, the SMSC 12, which supports multiple networks or dual mode services, will send a new HLR request to the right network through a different STP (e.g., 26B).

More particularly, initially, the SMSC 12 sends an SMS text message to a destination number that is currently provisioned in the SMSC database within the first network (e.g., CDMA) range (this is also called the First Delivery Attempt or FDA). However, in this example, the destination number has been ported into a different network (e.g., GSM), which the SMSC 12 does not know. The STP (e.g., STP 26A) that was supposed to route the SMS message checks the appropriate database (e.g., HLR 22A) and determines that the destination number has been ported. In that case, STP 26A returns an error message to the SMSC 12 with an indication of the migration of the destination number.

At this point, the SMSC 12 processes the error message. In this case, it may be assumed that the SMSC 12 has been configured to support multiple networks and allows the subscribers to migrate from different networks and/or allows for dual mode services (DMS) (such as AT&T Mobility DMS). Thus, the SMSC 12 shall perform at least two functions: (a) updating the destination number migration records in the database so that a future SMS delivery will request to send an SRI (Send Routing Info) message to the second (e.g., GSM) HLR (22B) first; and (b) sending an SRI-for-SM to the second network (e.g., GSM) HLR (22B) for the current failed SMS delivery.

The SMSC 12 then routes the SRI-for-SM request to the second network (e.g., GSM) HLR 22B, which returns the GSM-MSC routing address. Finally, the SMSC 12 sends the SMS message in MT-for-SM (Mobile Termination-for-Short Message) to the destination.

The SMSC loop protection mechanism in the SMSC 12 will prevent forwarding the SRI message again if all provisioned network trials have failed (migrated-from and migrated-to networks).

SMSC Management of Migration Number Range

In this scenario, let us assume that a range of users from 014-299-8400 to 014-299-8499 is defined as a CDMA range in the SMSC/FDA function. But the number 014-299-8453, which happens to be in this range, was migrated to the GSM network. In this case, the SMSC/FDA will first send the SMSREQ message to the STP 26A, and the STP 26A will recognize that this number is no longer in the CDMA network and is now a GSM number. As a result, the STP 26A will send an error message to the SMSC 12. If the SMSC 12 is configured to support both CDMA and GSM SMS service, then the SMSC 12 will re-route the request. The SMSC/FDA then sends a different GSM SRI_SMS message to the STP to re-route to the GSM HLR (e.g., 22B).

When more than 50% of subscribers in a range have migrated, the SMSC 12 will re-define the range to a new network range that will impact the rest of the non-migrated subscribers in this range. When the SMSC 12 sends a SRI-for-SM to the GSM HLR 22B for a non-migrated destination number, the STP 26B will return an error message to the SMSC 12 to indicate this number is still in the CDMA network. The SMSC 12 then recognizes that this destination number is not migrated and remains in the CDMA network. The SMSC 12 (a) updates the destination number non-migration records so that any future SMS deliveries to this number will request to send a SMSREQ message to the CDMA HLR (22A) first; and (b) the SMSC 12 sends an ANSI SMSRequest to the CDMA HLR (22A).

The SMSC 12 then routes the SMSRequest to the CDMA HLR (22A), which returns the CDMA-MSC routing address. Finally, the SMSC 12 sends the SMS in MT-for-SM to the destination.

For example a range of users from 941-970-2400 to 941-970-2599 may be defined as a GSM range in the SMSC-FDA. But the CDMA number 941-970-2459, which happens to be in this range, was not migrated to the GSM network. In this case the SMSC/FDA will send the message SRI-for-SM to the STP 26A and the STP 26A will recognize that this number is not a GSM number but a non-migrated CDMA number. As a result, the STP 26A will send an error message to the SMSC-FDA to re-route the SMS delivery. The SMSC service logic will mark the destination number as non-migrated number. The SMSC/FDA then sends an ANSI SMSREQ message to the STP 26B to re-route to the CDMA HLR 26B.

The following call flows help to further explain the form and operation of the exemplary embodiments of the present invention.

Figure 2:
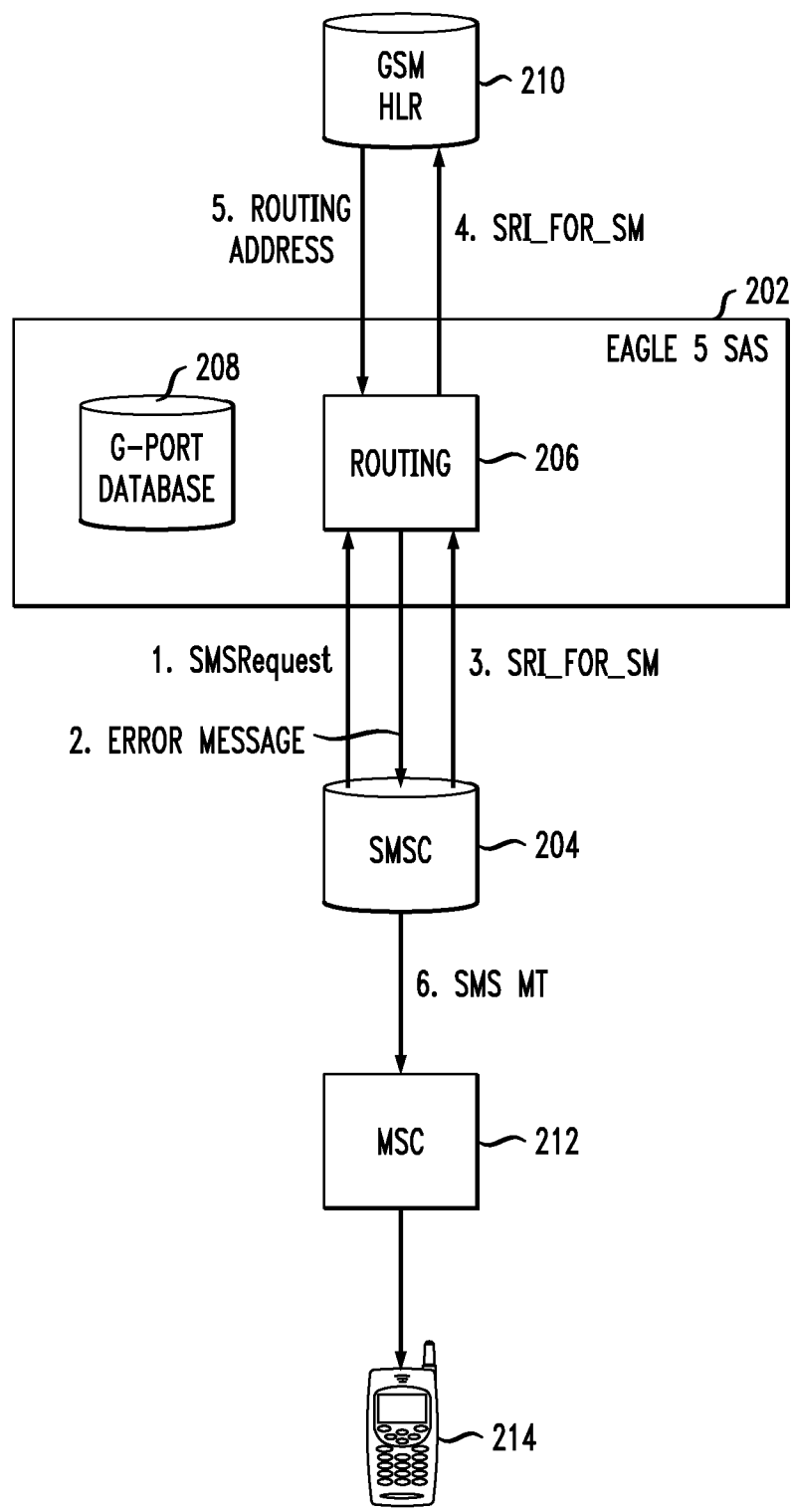
FIG. 2 illustrates the call flow for MT (Mobile Terminated) SMS Delivery for a Migrated or New GSM-only Subscriber: SMSRequest First.

The first example call flow involves delivery of an SMS text message for a subscriber that has migrated to the GSM network and has retained their IS-41 phone number, or is a new GSM subscriber with a number from the IS-41 range. The example of the GSM subscriber migrated to CDMA (IS-41) network example is not needed, since there will not be any GSM range. Also, even if there is a GSM range in the future, there will not be any likelihood that the GSM subscriber will be migrated to the CDMA network since all the migration will be from CDMA to GSM. The SMSC will be first launched in CDMA network. So the first default range of subscribers will be in the CDMA domain. In this regard, FIG. 2 illustrates the call flow for MT (Mobile Terminated) SMS Delivery for a Migrated or New GSM-only Subscriber: SMSRequest First:

1. An IS-41 SMSRequest is received by the STP (e.g., the EAGLE®5 Signaling Application System (SAS)) 202 from the SMSC 204 via the Routing function 206. The STP 202 searches the migration DB 208, and finds a match with subscriber type=5: "migrated".

2. Since this is an IS-41 message and the subscriber is migrated, the STP 202 returns a SMSRequest Return Result error response to the SMSC 204 with SMS_AccessDeniedReason=local value 5–"Reserved value, treat as Denied".

3. The SMSC 204 is programmed to formulate a GSM SRI-for-SM and send it to the GSM HLR 210 via the STP 202 upon receiving the error message.

4. The STP 202 checks the migration DB 208. Since this is a GSM SRI-for-SM and the subscriber is migrated, the STP 202 relays the message to the GSM HLR 210, based on the translation data in the G-Port DB 208.

5. The GSM HLR 210 responds with the SRI response, which provides the routing MSC address.

6. The SMSC 204 sends an MT message to the destination MSC 212, which forwards it to the terminating user 214 over an air interface.

Figure 3:
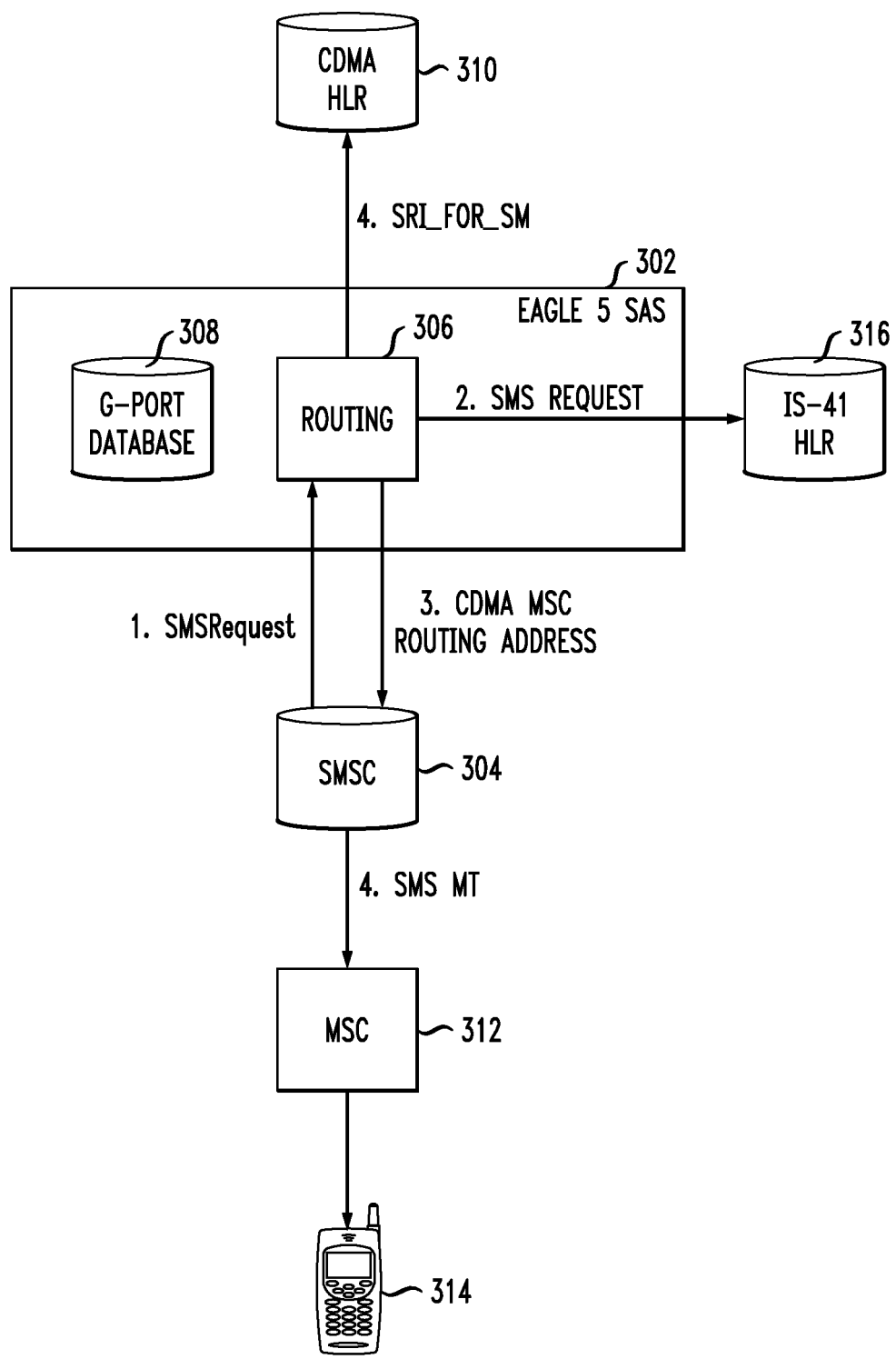
FIG. 3 illustrates a call flow for MT SMS Delivery for a Non-Migrated IS-41 Subscriber: SMSRequest First.

FIG. 3 illustrates a call flow for MT SMS Delivery for a Non-Migrated IS-41 Subscriber: SMSRequest First:

1. The SMSC 304 first sends an IS-41 SMSRequest to the CDMA HLR 310 via the Routing function 306 of the STP 302.

2. The STP 302 checks the migration DB 308. Since this is an IS-41 SMSRequest, and the subscriber is not migrated, the STP 302 relays the message to the IS-41 HLR 316.

3. The IS-41 HLR 316 returns the CDMA MSC routing address to the SMSC 304.

4. The SMSC 304 sends an SMS MT message to the destination MSC 312, which forwards to the terminating user 314.

Figure 4:
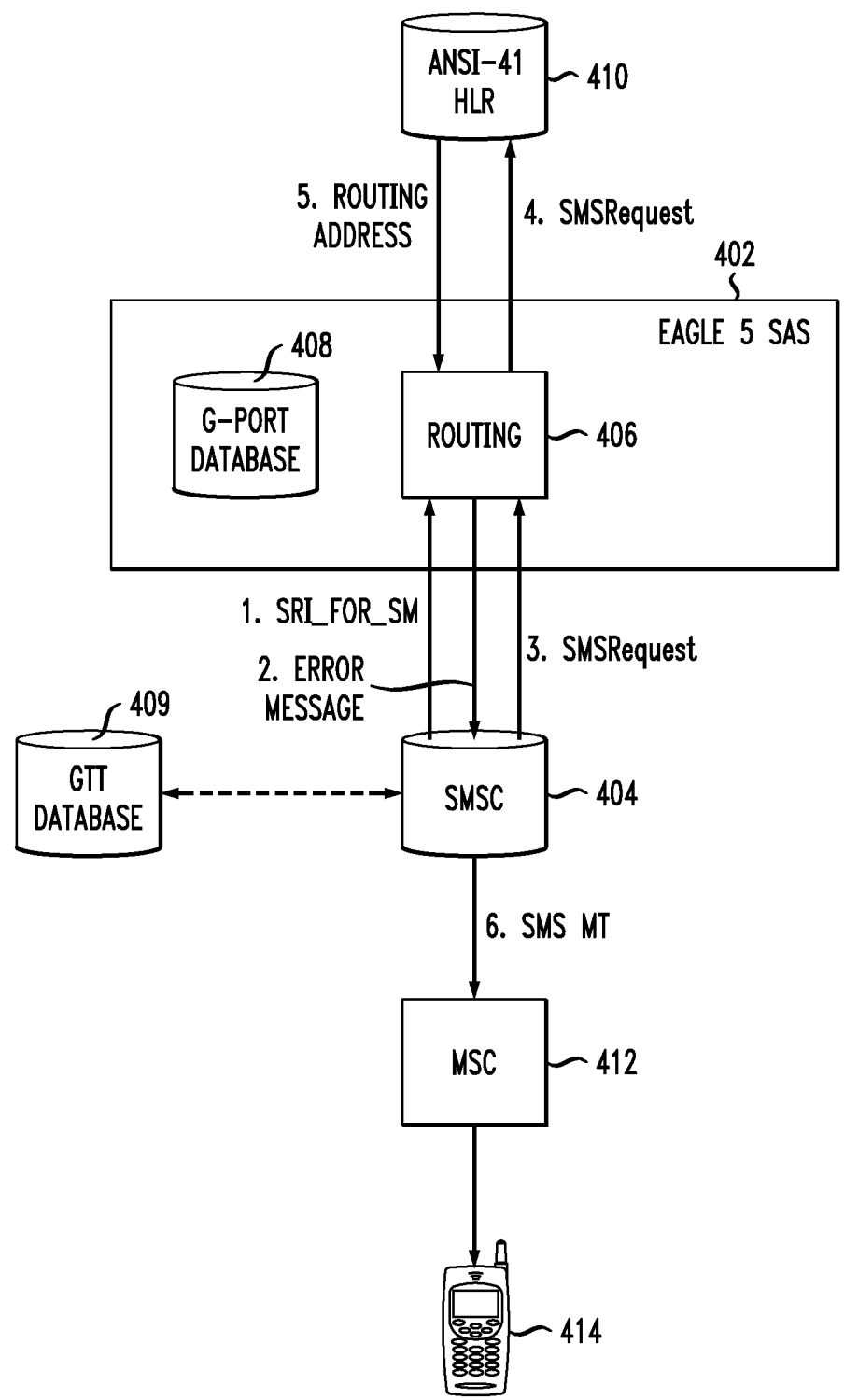
FIG. 4 illustrates a call flow for MT SMS Delivery for Non-Migrated IS-41 Subscriber: SRI-for-SM First.

This last case involves delivery of an SMS text message for an IS-41 subscriber that has not migrated to the GSM network. FIG. 4 illustrates a call flow for MT SMS Delivery for Non-Migrated IS-41 Subscriber: SRI-for-SM First:

1. The SMSC 404 sends an SRI-SM message to the GSM HLR 410 via the Routing function 406 of the STP 402. The STP 402 uses the MSISDN number in the SCCP CdPA as an MSISDN to search the IS41-GSM DB 408. This search results in either 1 of 2 possibilities. The first possibility is there is no match in the IS41-GSM DB 408 (if non-migrated subs are not provisioned in the DB). In this case, the message falls through to GTT (Global Title Translation). Global title translation is the SS7 equivalent to IP routing. Translation examines the destination address (e.g., the number being called) and decides how to identify it over the telephone network. The GTT DB 409 can be standalone or integrated within the SMSC 404. The GTT DB search would result in no match for this case (GTT tables for GSM TTs do not contain IS-41-only subs). The second possibility is a match is found in the IS41-GSM DB 408 (if both migrated and non-migrated subs are provisioned) with an RN translation to an ANSI Point Code for the IS-41 HLR 410, and a portability type of 0: "not known to be ported".

2. In the case of no match in G-Port DB 408 and no match in the GTT DB 409, the STP 402 returns a UDTS error message to the SMSC 404 per normal SCCP error handling. In the case a match is found with RN translation to the IS-41 HLR and portability type=0, the STP 402 returns a GSM SRI-for-SM error response with User Error=localValue 1–"Unknown Subscriber".

3. The SMSC 404 is programmed to formulate an IS-41 SMSRequest and send it to the IS-41 HLR 410 via the STP 402 upon receiving the error message.

4. The STP 402 checks the migration IS41-GSM DB 408. Since this is an IS-41 SMSRequest, and subscriber is not migrated, the STP 402 relays the message to the IS-41 HLR 410, either by using an RN translation in the IS41-GSM DB (if non-migrated subs are provisioned), or otherwise by GTT (if they are not provisioned).

5. The IS-41 HLR 410 returns the destination MSC routing address to the SMSC 404.

6. The SMSC 404 sends the SMS MT message to the destination MSC 412, which forwards it to the terminating user 414.

The solution described herein provides SMS delivery to recipients that migrated from technology networks. The SMSC will not query the HLR for receipt migration until received the error routing message from the STP, which is an effective method and eventually reduces traffic in the network.

In comparison with other known solutions, the SMSC does not have to query different technology network HLR every time. Only the SMSC receives the STP error message on the SMSC-FDA sending the SMSREQ. Then the SMSC will re-route the request. This solution is much more effective for Dual Mode Systems.

This invention provides a solution for the SMSC re-sending a routing address request to STP when the destination number was migrated or the destination number is in other network number range. The invention enhances SMSC service logic to handle the returned STP error messages due to destination number porting/migration between CDMA and GSM (or UMTS) and re-route the undelivered SMS request message to the right networks.

A loop protection mechanism is implemented at the SMSC so that all different network trial failed then the message will not be forwarded again There is also a policy to re-define the number range of migrated and non-migrated at the SMSC when the auditing logic finds more than 50% (or any provisionable number) subscribers in the current range migrate.

This invention will enhance SMSC service logic to handle the returned STP error messages due to destination number porting/migration between CDMA and GSM (or UMTS) and re-route the undelivered SMS request message to the right networks. With this invention, the SMSC does not have to query different technology network HLR every time. Only the SMSC receives the STP error message on the SMSC-FDA sending the SMSREQ. Then the SMSC will re-route the request. This inventive solution is much effective for Dual Mode System.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method comprising: receiving a short message service (SMS) text message from a sender at a short message service center (SMSC), wherein the SMS text message includes a destination number for a recipient of the SMS text message; sending a first routing request to a database in a first network for SMS routing information for the destination number via a first signal transfer point (STP); receiving from the first STP a message indicating whether the destination number is a migrated or a non-migrated destination number based on data received from the first database; receiving an error indication at the SMSC if the destination number and the first routing request are for different communication networks; sending a second routing request to a second database in a second network for SMS routing information for the destination number via a second STP, and when more than a pre-defined number of subscribers in a destination number range have migrated to a different network, the SMSC redefines the destination number range to a new network range that will impact at least some of the non-migrated subscribers in this range.

2. The method of claim 1, wherein the SMSC includes a loop protection mechanism that prevents forwarding a routing request message again if one or more provisioned network trials have failed.

3. The method of claim 1, wherein the first database comprises a home location register.

4. An apparatus comprising: a receiver that is configured to receive a short message service (SMS) text message from a sender, wherein the SMS text message includes a destination number for a recipient of the SMS text message; a transmitter that is configured to send a first routing request to a database in a first network for SMS routing information for the destination number via a first signal transfer point (STP); wherein: the receiver is further configured to receive from the first STP a message indicating whether the destination number is a migrated or a non-migrated destination number based on data received from the first database; the receiver is further configured to receive an error indication if the destination number and the first routing request are for different communication networks; the transmitter is further configured to send a second routing request to a second database in a second network for SMS routing information for the destination number via a second STP, and the apparatus further comprises a redefining mechanism that is configured operative-to redefine a destination number range to a new network range that will impact at least some of the non-migrated subscribers in this range when more than a pre-defined number of subscribers in the destination number range have migrated to a different network.

5. The apparatus of claim 4, wherein the SMSC includes a loop protection mechanism that prevents forwarding a routing request message again if one or more provisioned network trials have failed.

6. A computer program product comprising: a non-transitory computer-usable data carrier storing instructions that, when executed by a computer, cause the computer to perform a method comprising: receiving a short message service (SMS) text message from a sender at a short message service center (SMSC), wherein the SMS text message includes a destination number for a recipient of the SMS text message; sending a first routing request to a database in a first network for SMS routing information for the destination number via a first signal transfer point (STP); receiving from the first STP a message indicating whether the destination number is a migrated or a non-migrated destination number based on data received from the first database; receiving an error indication at the SMSC if the destination number and the first routing request are for different communication networks, sending a second routing request to a second database in a second network for SMS routing information for the destination number via a second STP; and redefining a destination number range to a new network range that will impact at least some of the non-migrated subscribers in this range when more than a pre-defined number of subscribers in the destination number range have migrated to a different network.

7. The product of claim 6, wherein the SMSC includes a loop protection mechanism that prevents forwarding a routing request message again if one or more provisioned network trials have failed.

* * * * *